US007668335B2

(12) United States Patent
Yano et al.

(10) Patent No.: US 7,668,335 B2
(45) Date of Patent: Feb. 23, 2010

(54) COMMUNICATION DEVICE, DIGITAL SIGNATURE VERIFICATION METHOD AND DIGITAL SIGNATURE GENERATION METHOD

(75) Inventors: Eiji Yano, Yokosuka (JP); Makoto Hamatsu, Yokohama (JP); Mao Asai, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 690 days.

(21) Appl. No.: 11/330,345

(22) Filed: Jan. 12, 2006

(65) Prior Publication Data

US 2006/0177111 A1    Aug. 10, 2006

(30) Foreign Application Priority Data

Jan. 12, 2005  (JP)  .............................. 2005-005528

(51) Int. Cl.
*G06K 9/00* (2006.01)
*H04L 9/32* (2006.01)

(52) U.S. Cl. ........................ 382/100; 382/182; 713/176

(58) Field of Classification Search ................ 382/100, 382/140, 156, 158, 168, 181, 209, 232, 254, 382/274, 276, 287, 291–294, 305, 312, 182, 382/186; 713/189, 176; 717/161; 709/202, 709/205

See application file for complete search history.

(56) References Cited

U.S. PATENT DOCUMENTS

| RE38,070 E | 4/2003 | Spies et al. |
| 7,213,047 B2 * | 5/2007 | Yeager et al. ............... 709/202 |
| 7,240,345 B2 * | 7/2007 | Sueyoshi et al. ............ 717/161 |
| 7,254,712 B2 * | 8/2007 | Godfrey et al. ............. 713/176 |
| 7,328,243 B2 * | 2/2008 | Yeager et al. ............... 709/205 |
| 2002/0056044 A1 * | 5/2002 | Andersson .................. 713/189 |

FOREIGN PATENT DOCUMENTS

| CN | 1455894 | 11/2003 |
| JP | 2003-337630 | 11/2003 |
| WO | WO 02/33879 A2 | 4/2002 |

OTHER PUBLICATIONS

N.T. Trask, et al., "Adapting public key infrastructures to the mobile environment", BT Technology Journal, vol. 19, No. 3, XP-001096931, Jul. 2001, pp. 76-80.
"PKCS #7: Cryptographic Message Syntax Standard", RSA Laboratories, RSA Security Inc., XP-002207635, Nov. 1, 1993, pp. 1-30.
"PKCS #11 v2.20: Cryptographic Token Interface Standard", RSA Laboratories, XP-002377484, Jun. 28, 2004, pp. 14, 105, and 109-113.

* cited by examiner

*Primary Examiner*—Seyed Azarian
(74) *Attorney, Agent, or Firm*—Oblon, Spivak, McClelland, Maier & Neustadt, L.L.P.

(57) ABSTRACT

It is an object of the present invention to provide a communication device, a digital signature verification method, and a digital signature generation method, in which the memory usage efficiency is improved without confidential information required for the verification or generation of a signature being easily leaked to the outside.

The Java application judges whether signature verification is required for the received signature target data. When judging that signature verification is required, the Java application outputs the received signature target data to the PKI of the platform. The PKI verifies the signature that has been added to the data output by the Java application and performs signature generation, and then notifies the Java application.

3 Claims, 8 Drawing Sheets

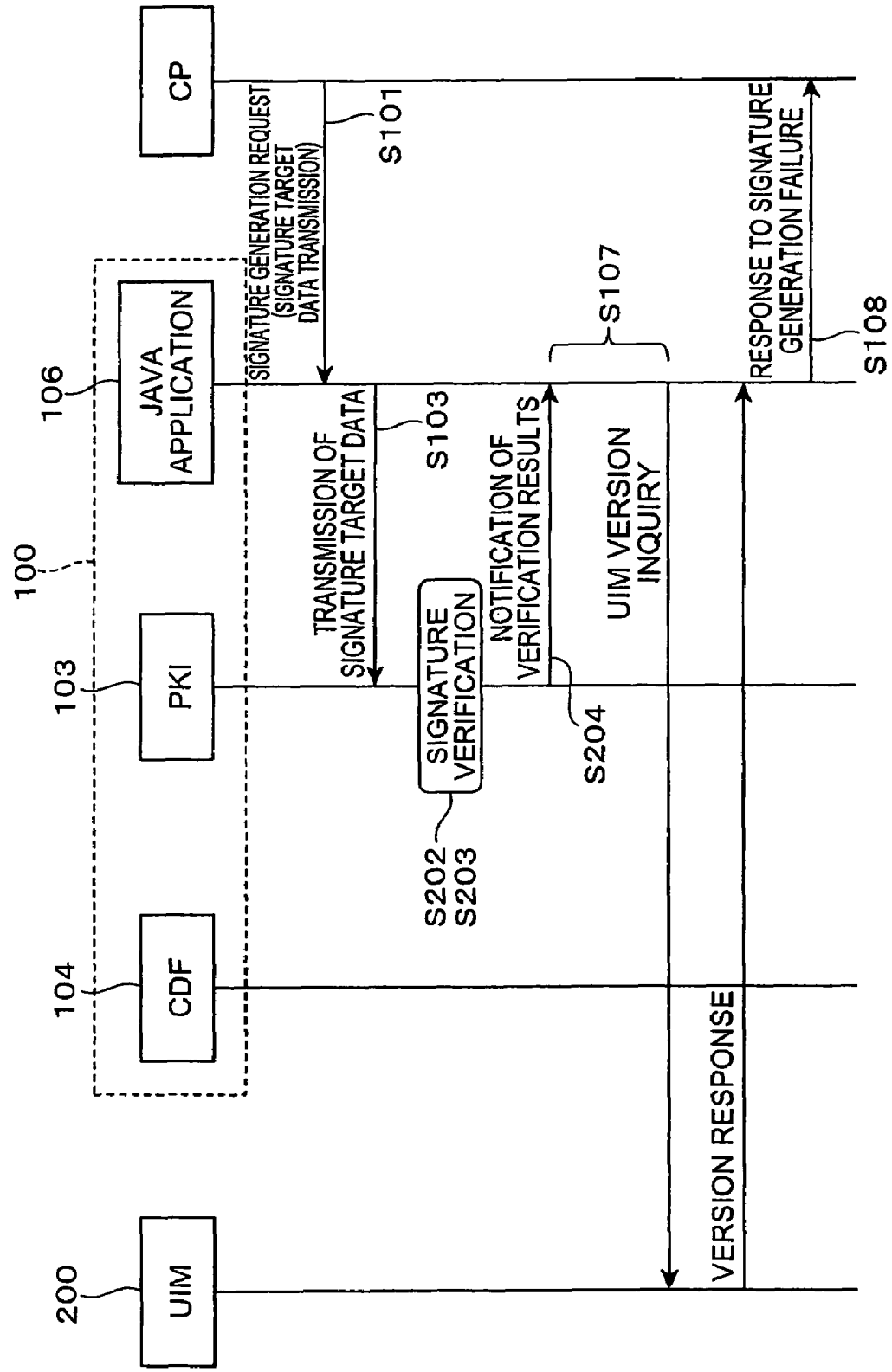

COMMUNICATION DEVICE, DIGITAL SIGNATURE VERIFICATION METHOD AND DIGITAL SIGNATURE GENERATION METHOD

BACKGROUND OF THE INVENTION

1. Field of the Invention

The present invention relates to a communication device that performs verification or generation of a digital signature, a digital signature verification method and a digital signature generation method.

2. Related Background of the Invention

A communication terminal that receives data via a network performs certification processing on the received data in order to ensure security. More specifically, as per Japanese Patent Application Laid Open No. 2003-337630 (Patent Document), the communication terminal receives data that is encrypted by using a secret key and, upon receipt, the communication terminal is able to judge that the received data has been authorized by performing decoding by using the public key of a certification server that is the certification authority.

SUMMARY OF THE INVENTION

The communication terminal according to this patent document performs processing to receive data by means of a CPU and executes processing to verify the received data. Here, in recent years, because Java applications described in Java can be downloaded and installed from the outside, the execution of data reception processing and data verification processing by using a Java application may be considered. Further, Java is a registered trademark of U.S. Sun Microsystems, Inc.

However, the use of a root certificate or the like is required in order to perform the signature verification and generation of data. However, because a root certificate is highly confidential information, there is the risk that the root certificate or the like will be leaked to the outside assuming it is possible to easily handle the root certificate by means of an application that is based on the premise that the application is installed as a result of being downloaded from the outside as per a Java application. Therefore, an arrangement where a root certificate or the like cannot be handled by a Java application is required.

Further, in a case where a Java application is installed a plurality of times, which is the case where both data reception processing and data verification processing are performed by means of a Java application, the communication terminal comprises duplicate functions and memory usage efficiency is then poor.

Therefore, an object of the present invention is to provide a communication device that improves the memory usage efficiency without confidential information that is required for the verification or generation of a signature being easily leaked to the outside, a digital signature verification method, and a digital signature generation method.

In order to achieve the above object, the communication device of the present invention is a communication device comprising a platform program that controls constituent elements that the device comprises, and an application that runs on the platform program and comprises a data reception function, wherein the application judges whether signature verification is required for the received data; the application outputs the received data to the platform program when it is judged that signature verification is required; and the platform program performs verification of a signature that is added to the data output by the application.

Further, the digital signature verification method of the present invention is a digital signature verification method of a communication device that has a platform program that controls constituent elements that the device comprises, and an application that runs on the platform program and comprises a data reception function, the method comprising a judging step in which the application judges whether or not signature verification is required for the received data; an outputting step in which the application outputs received data to the platform program when it is judged in the judging step that signature verification is required; and a verification step in which the platform program verifies a signature that is added to data output by the application in the output step.

According to the present invention, the application that runs on the platform program that controls the constituent elements of the communication device judges whether signature verification is required for the received data and, when signature verification is required, data is output to the platform program and the platform program is able to verify the signature added to the data. As a result, the present invention is able to perform signature verification by means of a platform program that the user is unable to handle directly, whereby the leakage of confidential information relating to signature verification can be prevented to a high level and advanced security services can be implemented. Further, the duplication of the verification function and storage in the communication device can be prevented, whereby efficient usage of the resources of the communication device is made possible. In addition, a verification function for signature verification can be rendered unnecessary in the application and cost reductions for the development of the application are possible.

Further, the communication device of the present invention is a communication device comprising a platform program that controls the constituent elements that the device comprises, and an application that runs on the platform program and comprises a data reception function, wherein the application judges whether it is possible for the communication device to generate a signature for the received data; the application outputs the received data to the platform program when it is judged that signature generation can be performed by the communication device; the platform program generates a signature for the data output by the application; and the application transmits the signed data.

Further, the digital signature generation method of the present invention is a digital signature generation method of a communication device that has a platform program that controls constituent elements that the device comprises, and an application that runs on the platform program and comprises a data reception function, the method comprising a judging step in which the application judges whether it is possible for the communication device to generate a signature for the received data; an outputting step in which the application outputs the received data to the platform program when it is judged in the judging step that signature generation can be performed by the communication device; a signature step in which the platform program generates a signature for the data output by the application in the outputting step and outputs the signed data to the application; and a transmitting step in which the application transmits the data signed in the signature step.

According to the present invention, the application judges whether the communication device is able to generate a signature and, when it is judged that signature generation is possible, signature generation is performed by the platform program and the application is able to transmit data for which a signature has been generated. As a result, because signature generation is performed by means of a platform program that the user is unable to manipulate, leakage of confidential information relating to signature generation can be prevented to a high level and advanced security services can be implemented. Further, duplication of the signature generation function and storage in the communication device can be prevented, whereby efficient usage of the resources of the communication device is made possible. In addition, a generation function for signature generation can be rendered unnecessary for the application and cost reductions for the development of the application are possible.

Further, the communication device of the present invention preferably further comprises an external memory that is detachable from the communication device and which generates a signature for the received data, wherein the platform program preferably outputs data to the external memory and generates a signature by inputting the signed data from the external memory.

According to the present invention, the platform program transmits data to an external memory such as a UIM, the external memory receives data, and signature generation can be performed for the received data. As a result, the leakage of confidential information (root certificate, secret key, and so forth) relating to the signature generation of the external memory can be prevented to a high level by using a platform program that a general user is unable to handle directly, whereby advanced security services can be implemented.

Further, the application of the communication device of the present invention preferably verifies version information indicating the function of the external memory, and does not output data to the platform program when the external memory is judged not to have a predetermined function on the basis of the version information, and outputs data to the platform program when the external memory is judged to have the predetermined function on the basis of the version information.

According to the present invention, the application verifies version information of the external memory and, when it is judged that an external memory without a predetermined function is mounted on the basis of the version information, data that is the target of signature generation is not output to the platform program so that the signature generation processing is not continued and, when it is judged from the version information that an external memory with a predetermined function is mounted, data is output to the platform program. As a result, futile processing by a platform program can be prevented when the external memory is not compatible with signature generation and when there is no secret key or the like.

The communication device of the present invention preferably comprises an internal memory that is contained in the communication device and which stores signature generation information for performing signature generation for the received data, wherein the platform preferably extracts the signature generation information from the internal memory and performs signature generation for the data by using the signature generation information.

According to the present invention, signature generation information is stored in an internal memory and signature generation can be performed by the platform by using this signature generation information. There is no need to provide an external memory for signature generation and signature generation function can be implemented at low cost. In addition, because the internal memory is contained in the communication device, the confidentiality of important confidential information such as signature generation information can be improved.

According to the present invention, the application that runs on the platform program that controls the constituent elements of the communication device judges whether signature verification is required for the received data and, when signature verification is required, data is output to the platform program and the platform program is able to perform verification of the signature added to the data. As a result, the present invention performs signature verification by means of a platform program that a user is unable to handle directly, leakage of confidential information relating to signature verification can be prevented to a high level, and advanced security services can be implemented. Further, duplication of the verification function and storage in the communication device can be prevented, whereby efficient usage of the resources of the communication device is made possible. In addition, a verification function for signature verification can be rendered unnecessary in the application and cost reductions for the development of the application are possible.

Moreover, according to the present invention, the application judges whether the communication device is able to generate a signature and, when it is judged that signature generation is possible, signature generation is performed by the platform program and the application is able to transmit data for which a signature has been generated. As a result, because signature generation is performed by means of a platform program that the user is unable to manipulate, leakage of confidential information relating to signature generation can be prevented to a high level and advanced security services can be implemented. Further, duplication of the signature generation function and storage in the communication device can be prevented, whereby efficient usage of the resources of the communication device is made possible. In addition, a generation function for signature generation can be rendered unnecessary in the application and cost reductions for the development of the application are possible.

BRIEF DESCRIPTION OF THE DRAWINGS

FIG. 8 shows a sequence when a version error of the UIM200 is produced.

DESCRIPTION OF THE PREFERRED EMBODIMENTS

The present invention can be easily understood by considering the detailed description hereinbelow with reference to the attached drawings that are shown for one embodiment. Embodiments of the present invention will be described in succession with reference to the attached drawings. Wherever possible, the same numerals are assigned to the same parts and repetitive description is omitted here.

Figure 1:
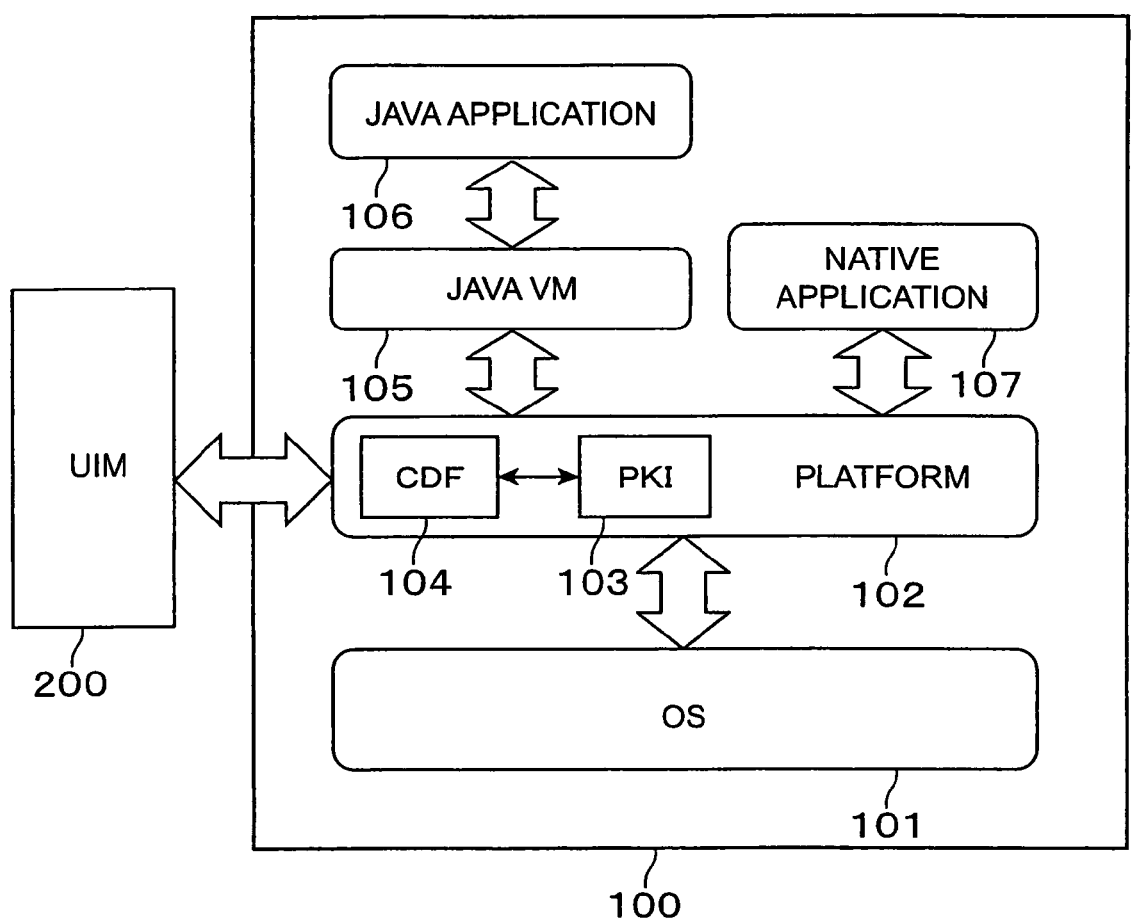
FIG. 1 is a software block constitutional view of a mobile device 100.

FIG. 1 is a software block constitutional view of a mobile device 100, which is the communication device of this embodiment. The mobile device 100 is constituted comprising hardware such as a CPU, RAM, EEPROMROM, a wireless communication section, a display, an operation button, a microphone, and a speaker, which are not shown. Further, the mobile device 100 is constituted by programs such as an OS (Operating System) 101, a platform 102 (platform program), a JavaVM (Virtual Machine) 105, a Java application 106, and a native application 107 that are for operating this hardware. Further, the platform 102 is constituted comprising a PKI (Public Key Infrastructure) 103 and a CDF (Certificate Download Function) 104. The abovementioned ROM and EEPROM store the abovementioned programs and the CPU executes these programs (software).

In addition, an UIM (User Identity Module) 200, which is an external memory, can be detachably mounted on the mobile device 100. The UIM200 is an IC memory, for example, is constituted comprising a CPU, RAM, and a ROM, and comprises a computation function for a digital signature generation function. The UIM200 stores version information representing the function of the UIM200 as well as essential confidential information relating to security such as a root certificate, a subroot certificate, a secret key, and a client certificate. In addition, the UIM200 stores telephone number information and ID information, which are subscriber information of the mobile device 100.

The programs constituting the mobile device 100 will be described hereinbelow. The OS101 is basic software for operating the mobile device 100 and the platform 102 runs on the OS101.

The platform 102 is a control program that controls the I/O for the operation button of the mobile device 100, the I/O for the wireless communication section, the I/O for the UIM200, and so forth, and which centrally controls the respective constituent elements (hardware) that the mobile device 100 comprises. The platform 102 comprises a PKI103 and a CDF 104 and is able to extract confidential information such as a root certificate, subroot certificate, client certificate, and secret key from the UIM200 by using a PKI103 and CDF104. The platform 102 works together with the operation of the CPU and functions as signature verification means for executing processing to perform signature verification and as signature generation means for executing processing to generate a signature.

PKI103 is a program that performs signature verification for signature target data (signed data) provided with a digital signature sent from the Java application 106 and which executes processing for digital signature generation for signature target data. When performing signature verification of signature target data, PKI103 performs personal verification by verifying a certificate path by using a root certificate and a subroot certificate and judges the existence of falsification by calculating the Hash value of signature target data. Further, when performing processing for signature generation, the PKI103 calculates the Hash value of signed data that has been sent from the Java application 106 and outputs an instruction to the CDF104 to perform signature generation in the UIM200 by using the Hash value. Further, the Hash value is a value calculated from a Hash function. The Hash function is 'SHA-1' or 'MD5', for example. These Hash functions are both one-directional functions and are therefore functions that preclude extrapolation of the original from the generation data.

Furthermore, the PKI103 outputs an instruction to the CDF104 to remove a client certificate from the UIM200. In addition, upon removal of a signature value and client certificate from the UIM200 via the CDF104, the PKI103 performs a conversion to the format for the digital signature prescribed by PKCS#7, generates signed data, and outputs a Java application 106. Further, the processing for acquiring a client certificate can be omitted when the client certificate is held by the PKI103 beforehand.

The CDF104 is a program that allows direct access to the UIM200 and is a program for extracting a root certificate, subroot certificate, client certificate, or signature value from the UIM200 in accordance with an instruction from the PKI103.

The Java VM105 is middleware having an environment for operating Java applications described in Java, which is an object-oriented interpreter language. Java VM105 controls the execution of the Java application 106 while sequentially interpreting intermediate code that is generated by a Java compiler.

The Java application 106 is a program that is described in Java which is a program that can be operationally stored in the mobile device 100 as a result of being downloaded from a content provider on a network in this embodiment. The Java application 106 is a program that runs on the platform 102 via the Java VM105. In cooperation with the operations by the CPU, the Java application 106 functions as judging means for judging whether or not signature verification is necessary or signature generation is possible for received data and as outputting means for outputting received data to the platform 102 when it is judged that signature verification or signature generation is required or possible. Further, the Java application 106 functions as transmitting means for transmitting signed data to the content provider in cooperation with operations by the CPU. In addition, in cooperation with the operations by the CPU, the Java application 106 functions as version information acquiring means for extracting version information from the UIM200 and as judging means for judging whether or not the UIM200 has a predetermined function.

More specifically, the Java application 106 has a communication function that utilizes wireless communications of the mobile device 100 and is able to transmit and receive data with respect to the content provider. Further, the Java application 106 judges whether or not the signature target data received from the content provider is signed data and, when it is judged that the signature target data is signed data, the signed data is transmitted to the PKI103 so that signature verification is performed and the verification result is received from the PKI103. Further, the Java application 106 is able to access the UIM200 and extract version information of the UEIM200 in order to judge whether the UIM200 has a predetermined function (signature generation function) on the basis of the version information. In addition, upon receipt of the signed data for which a signature has been generated from the PKI103, the Java application 106 sends back the signed data for which a signature has been generated to the content provider. Further, in this embodiment, the Java application 106 is not limited to a Java application and may instead be an application that permits downloads from the outside (network or external storage medium).

The native application 107 is an application program that is pre-installed on the mobile device 100, such as a communication control program that executes communication control, an operation control program to allow the operation button (not illustrated) to operate, and a display control program for displaying information on a display (not shown), or the like, for example.

The mobile device 100 is constituted as detailed hereinabove and, by replacing_an external memory as per the UIM200 with an internal memory (not shown) that is contained in the mobile device 100, essential confidential information related to security such as a root certificate and subroot certificate, and a secret key, and signature generation information such as a client certificate may be stored in the internal memory. When an internal memory is used, the platform 102 of the mobile device 100 is preferably constituted comprising either a computation function for performing digital signature generation by using signature generation information extracted by extracting signature generation information from the internal memory, or is constituted to be able to implement a computation function for digital signature generation by co-operating with a computation program or computation hardware that is constituted separately from the platform 102.

Figure 2:
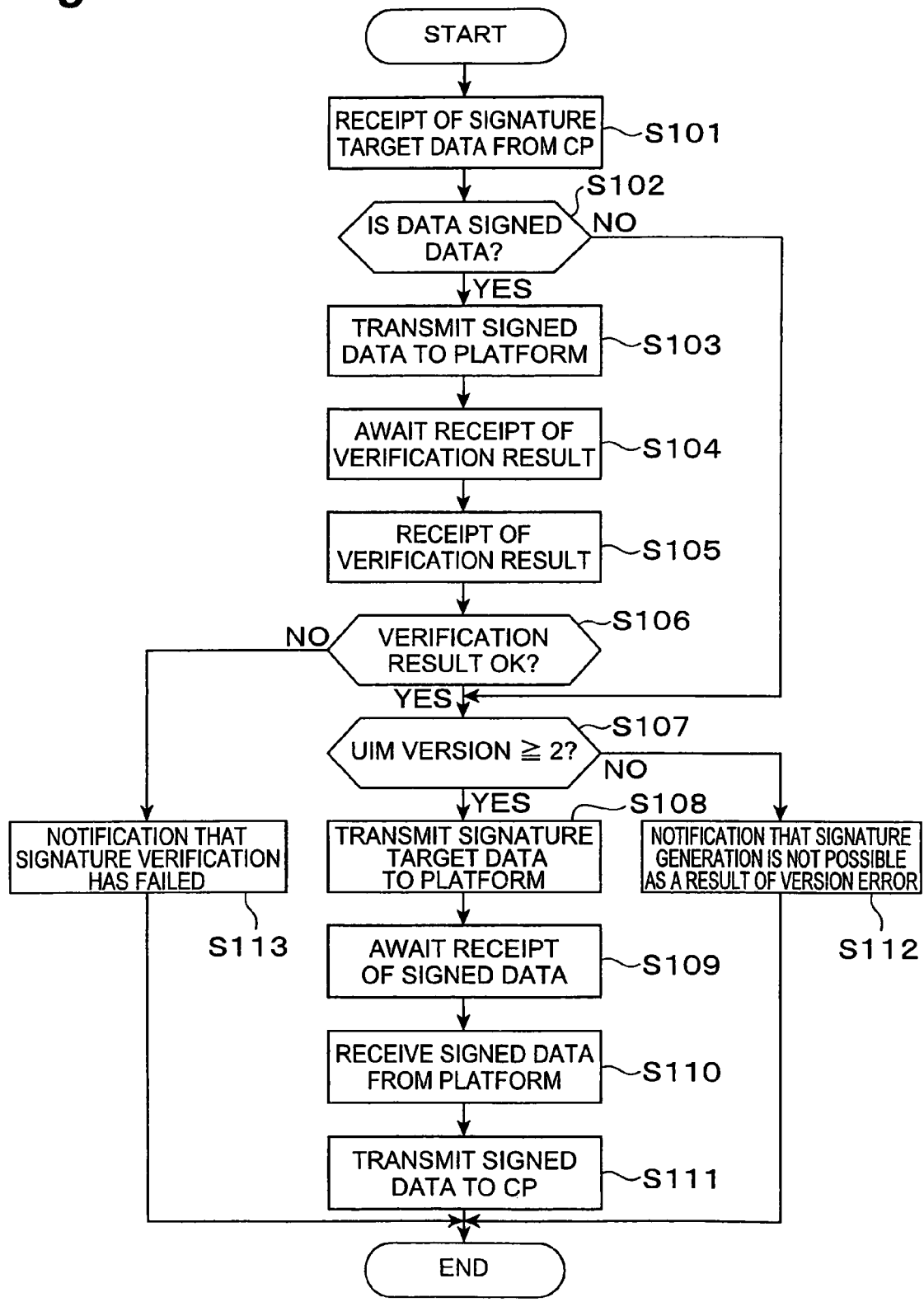
FIG. 2 is a flowchart showing the operation of a Java application 106 of the mobile device 100.

The operation of the mobile device 100 that is constituted thus will be described next. FIG. 2 is a flowchart showing the operation of the Java application 106 of the mobile device 100 of this embodiment.

In the mobile device 100, signature target data (including information indicating a signature generation request), which is a target for performing signature generation, is received from the content provider (CP) by using a communication function of the Java application 106 (S101). It is judged by the Java application 106 whether the received signature target data is signed data (S102). More specifically, when a HTTP response is received from the content provider, it is judged by means of the Java application 106 whether numerical information indicating whether the received signature target data is signed data is described in the "Content-Type" numerical information in the HTTP response header.

In S102, when it is judged by means of the Java application 106 that the received signature target data is signed data, the signature target data is output to the PKI103 of the platform 102 (S103). Signature verification is performed by the PKI103 and the Java application 106 enters a signature verification result standby state (S104). The verification result is received by the Java application 106 from the PKI103 (S105). The details of the signature verification will be described in detail in FIG. 3.

The verification result is judged by the Java application 106 (S106). In S106, when it is judged by the Java application 106 that the verification result is OK, an inquiry request inquiring whether the version of the UIM200 is a predetermined version or higher is issued to the UIM200 by the Java application 106 in order to judge whether the UIM200 is capable of signature generation. Further, it is judged by the Java application 106 whether the version of the UIM200 is a predetermined version (version 2, for example) or higher (S107). Further, a step of judging whether signature generation is required for judging whether or not there has been a signature generation request from a content provider may be provided prior to the step of judging whether signature generation is possible of step S107. In this case, if there is a signature generation request from a content provider, the processing proceeds to S107, and, if there is no request, processing to notify the content provider of the result of signature verification is executed, whereupon the processing by the Java application 106 may be terminated.

In S107, when it is judged by means of the Java application 106 that the UIM200 is a predetermined version or higher, it is judged that the UIM200 comprises a predetermined function (signature generation function) and the signature target data is first output to the PKI103 (S108). PKI103, to which the signature target data has been output, executes processing to perform signature generation and the Java application 106 enters a signature generation processing standby state (S109).

Thereafter, signed signature target data, that is, signed data, is output by the PKI103 to the Java application 106 (S110) and the signed data is transmitted to the content provider by the Java application 106 (S111).

In S107, in cases where it is judged by the Java application 106 that the version of the UIM200 is not of a predetermined value or higher and the UIM200 does not comprise a predetermined function (signature generation function), the fact that signature generation is impossible due to a version error is first displayed on the mobile device screen and, following user confirmation (or after the user performs a confirmation operation), the content provider is notified (S112). Once the user has been notified of the error content and has confirmed the error content, the user is able to find out that the UIM200 is not compatible with the signature function or that there has been another error (or that the signature of the data from the content provider is invalid), whereby convenience can be improved.

Further, in S106, in cases where it is judged by the Java application 106 that the verification result in the signature verification processing in the PKI103 is not OK, the fact that signature verification has failed (that the signature is invalid) is displayed on the mobile device screen and, following confirmation by the user (or after the user has performed a confirmation operation), the content provider is notified (S113). Once the user has been notified of the error content and has confirmed same, the user is able to find out that signature verification has failed as a result of the invalidity or the like of the signature of the data from the content provider or that there has been another error (the UIM200 is not compatible with the signature function) whereby convenience can be improved.

As detailed above, the mobile device 100 is constituted so that the Java application 106 is able to receive signature target data from a content provider and transmit the signed data to the content provider, and the platform 102 or UIM200 is able to perform signature verification and signature generation. Accordingly, there is no need to include a function for signature verification and signature-generation in the Java application 106.

Figure 3:
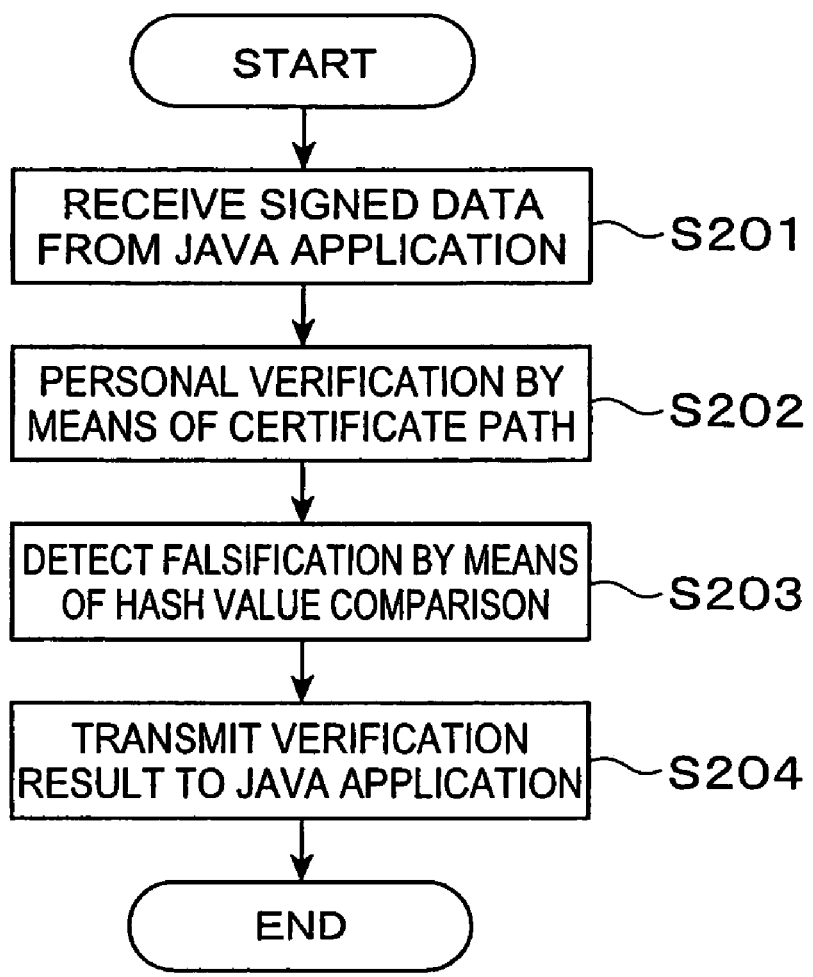
FIG. 3 is a flowchart showing the operation of a PKI103.

Signature verification processing of the PKI103 will be described next by using FIG. 3. FIG. 3 is a flowchart showing the operation of the PKI103.

In the PKI103, signed data is received from the Java application 106 (S201). When signature verification is performed by the PKI103, a root certificate and subroot certificate are extracted from the UIM200 via the CDF104. Personal verification of the received signed data is performed on the basis of the certificate path that uses the extracted root certificate and subroot certificate (S202). Here, a certificate path is one item of information for confirming the reliability of a certificate. The certificate path is continuous trusted certificate chain information, which is constituted by a certificate that is issued from a trusted certifying facility. This chain information is information of certificates that include a specified certificate (subroot certificate) and a certificate (root certificate) issued by a root certification facility. Further, a subroot certificate is known as complete or partial certificate information excluding a root certificate of certificate chain information.

Further, the Hash value that is included in the signature target data and the Hash value calculated from the signature target data are compared. Here, when the Hash values match, it is judged by the PKI103 that there has been no falsification. Further, when the Hash values do not match, it is judged by the PKI103 that falsification has taken place (S203).

Following the falsification judgment, information indicating the verification result, which indicates the presence or absence of falsification and personal verification, is output by the PKI103 to the Java application 106 (S204).

As detailed above, in the signature verification processing of the PKI103, the presence or absence of falsification and personal verification can be detected by means of the signature verification processing of the PKI103.

Figure 4:
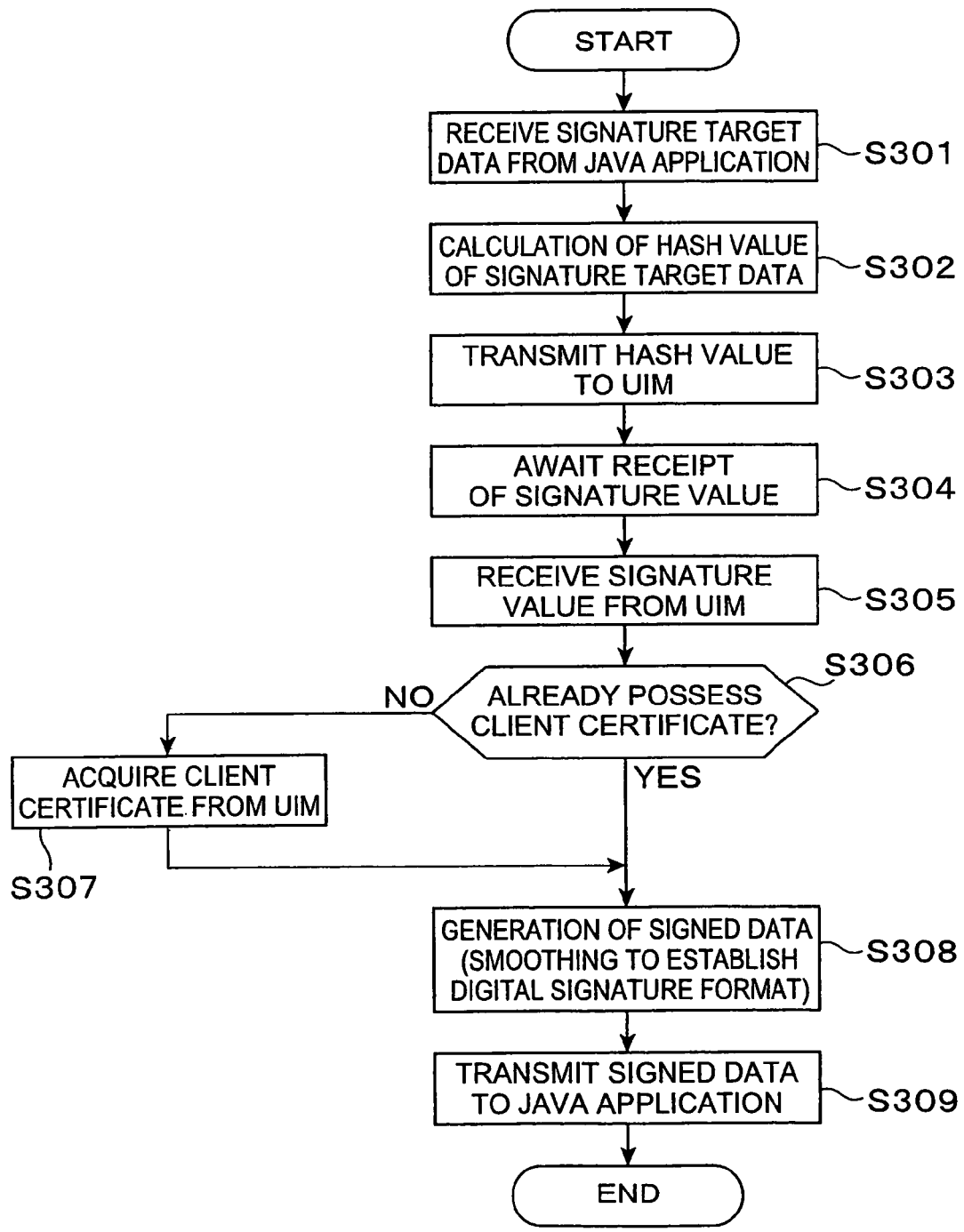
FIG. 4 is a flowchart showing an operation for signature generation processing of the PKI103.
Figure 5:
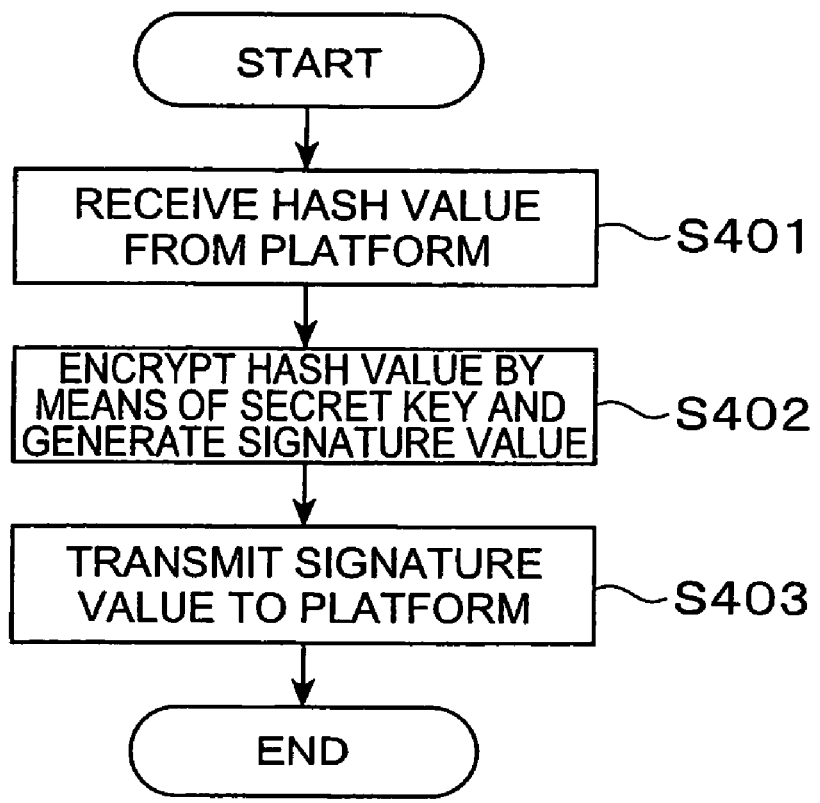
FIG. 5 is a flowchart showing an operation for signature generation processing of a UIM200.

The signature generation processing for signature target data of the PKI103 will be described next by using FIGS. 4 and 5. FIG. 4 is a flowchart showing the operation for the signature generation processing of the PKI103 and FIG. 5 is a flowchart showing the operation for the signature generation processing of the UIM200.

As shown in FIG. 4, in the PKI103, the signature target data is sent from the Java application 106 and received by the PKI103 (S301). The Hash value of the received signature target data is calculated by the PKI103 (S302). The calculated Hash value is output together with the signature generation request signal to the CDF104 and the Hash value and signature generation request signal is output to the UIM200 by the CDF104 (S303).

The PKI103 enters a reception standby state for receiving a signature value from the UIM200 (S304). Meanwhile, the UIM200 performs processing to generate a signature value. The operation of the UIM200 will be described by using FIG. 5. A Hash value and signature generation request signal are received from the PKI103 via the CDF104 (S402). The received Hash value is encrypted by means of a secret key that is saved in the UIM200 and a signature value is generated (S402). Further, the signature value is then output to the PKI103 via the CDF104 (S403).

Thus, the signature value for signature generation is generated by the UIM200. Returning now to FIG. 4, this is described successively. The PKI103 receives the signature value from the UIM200 (S305). Subsequently, it is judged whether the client certificate is held by the PKI103 (S306). In S306, when it is judged that the client certificate is not held by the PKI103, the generation of signed data that uses the signature value and the client certificate is performed. More specifically, the generation of signed data for which a digital signature has been established in accordance with the format of PKCS#7 is performed (S308).

Further, in S306, when the client certificate is not held by the PKI103, the client certificate is read and acquired from the UIM200 via the CDF104 by the PKI103. Signed data for which a digital signature has been established in accordance with the format of the PKCS#7 is generated by using the acquired client certificate and signature value (S308). Thereafter, the signed data is output to the Java application 106 (S309).

As detailed above, the PKI103 of the platform 102 is able to execute processing for signature generation and, unlike the Java application 106, the PKI103 is able to gain straightforward and stable access to the UIM200 and is able to perform signature generation reliably and stably by executing the processing for signature generation.

Figure 6:
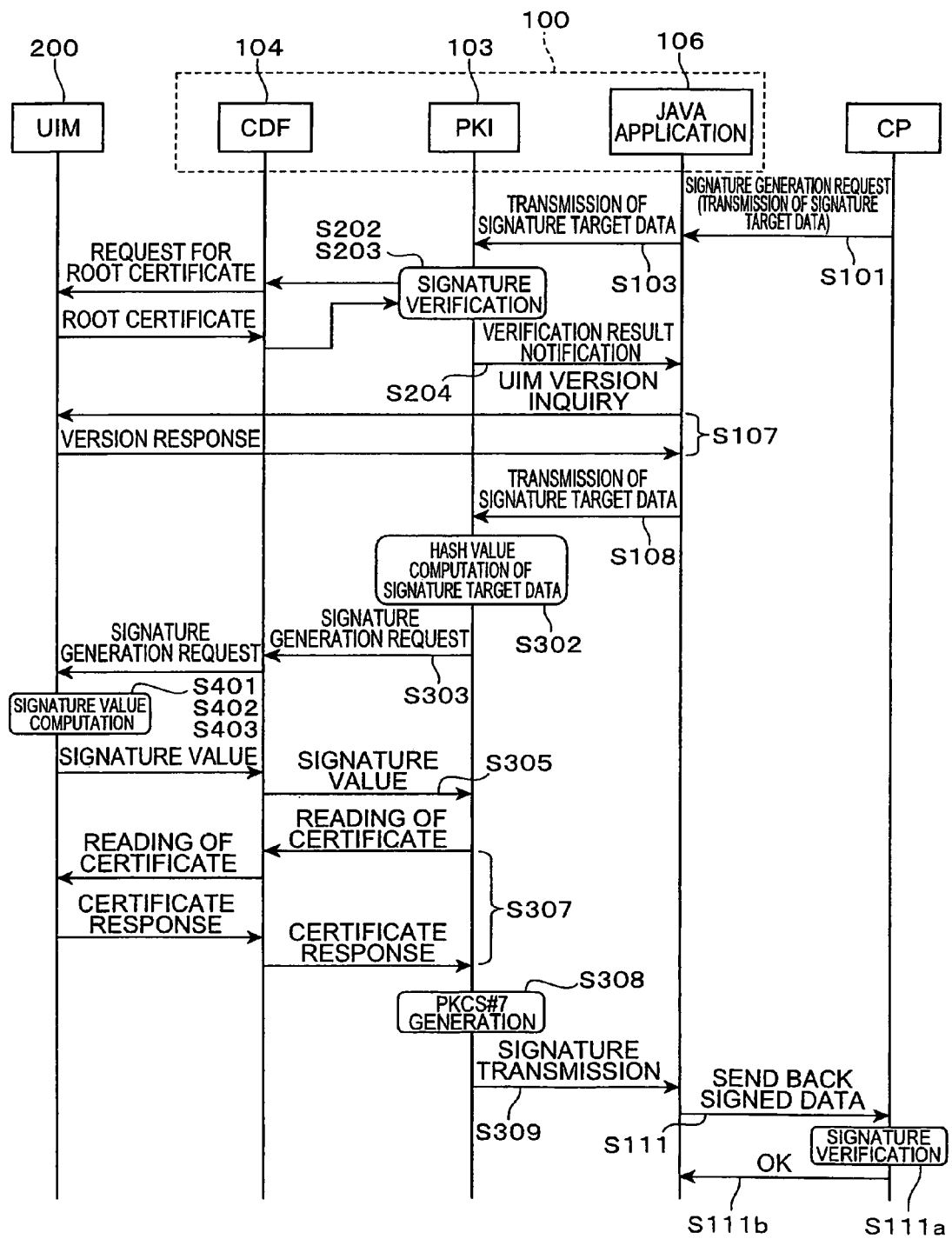
FIG. 6 shows the sequence from the execution of signature verification to the execution of signature generation.

A summary of the transmission and reception of signals by the mobile device 100, the client provider (CP) and UIM200 will be described by using a sequence diagram. FIG. 6 is a sequence diagram when signature verification and then signature generation are performed.

Signature target data (signed data) including a signature generation request is transmitted from the content provider (CP) and received by the Java application 106 (S101). The Java application 106 outputs the received signature target data to the PKI103 (S103). The PKI103 removes a root certificate and a subroot certificate from the UIM200 via the CDF104 and performs signature verification of signature target data that uses the root certificate and subroot certificate (S202, S203), whereupon the Java application 106 is notified of the verification result (S204).

Thereafter, the Java application 106 acquires version information of the UIM200 by way of an inquiry (S107). Here, because predetermined version information can be acquired, the Java application 106 outputs signature target data to the PKI103 (S108).

The PKI103 calculates a Hash value from the signature target data (S302) and outputs a signature generation request signal and the Hash value to the CDF104 (S303). The CDF104 transfers the signature generation request signal and the Hash value to the UIM200 and the UIM200 performs signature generation processing, calculates a signature value and outputs the signature value to the CDF104 (S401, S402, S403).

The PKI103 receives the signature value via the CDF104 (S305). The PKI103 then reads the client certificate from the UIM200 (S307). The PKI103 establishes a digital signature for the signature target data in accordance with the format of the digital signature of the PKCS#7 by using the read client certificate and signature value, thereby generating signed data (S308). The PKI103 outputs the signed data thus generated to the Java application 106 (S309).

The Java application 106 transmits the transmitted signed data to the content provider (S111).

When the content provider performs signature verification of the signed data thus received (S111a) and judges the received data to have a valid signature, the content provider transmits a signal indicating that the verification is OK to the mobile device 100 (Java application 106) (S111b).

Thus, the communication system of this embodiment sends and receives data by means of the Java application 106 and the platform 102 (PKI103) and UIM200 are able to perform signature verification and signature generation.

Figure 7:
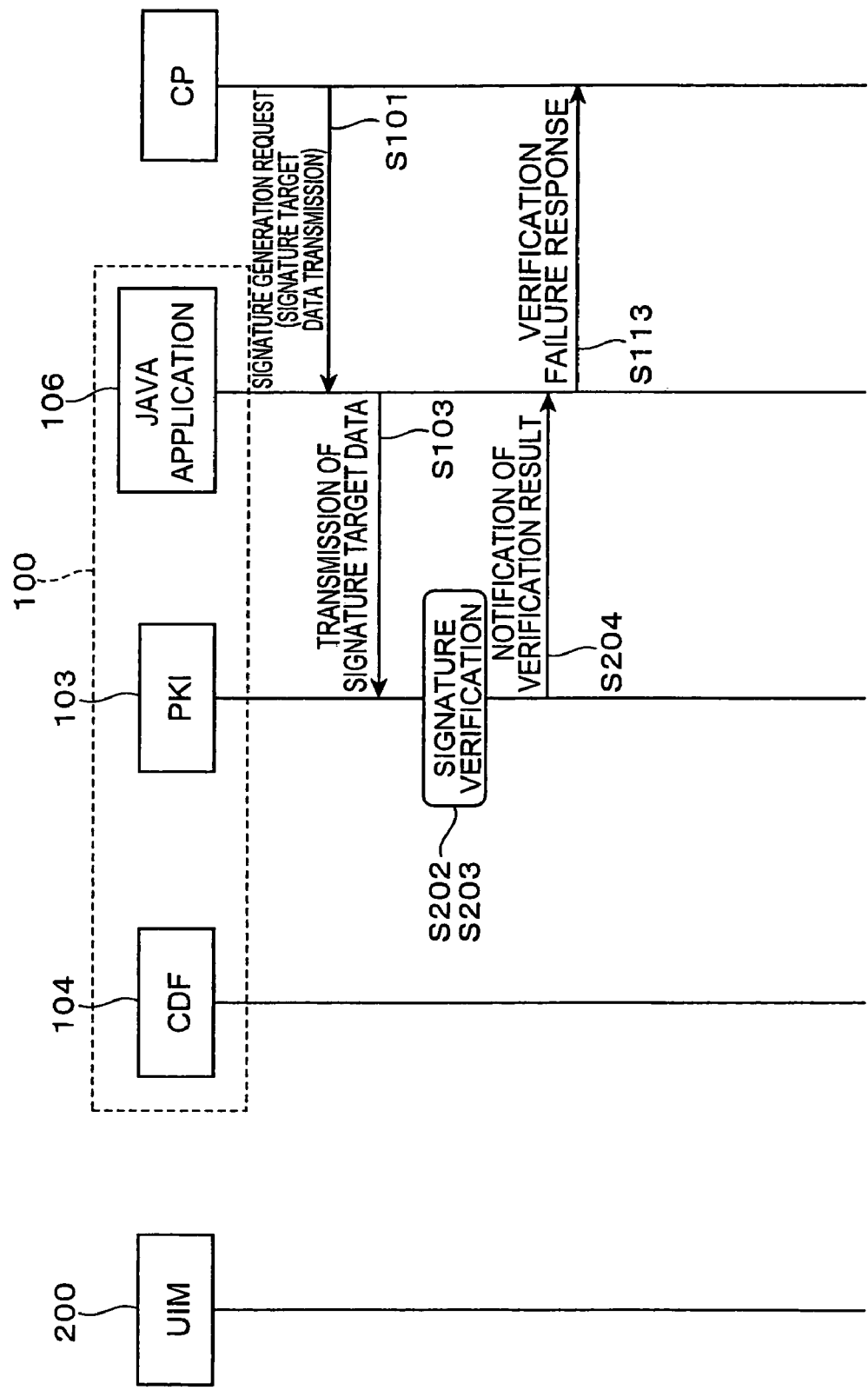
FIG. 7 shows the sequence when an error is produced in the signature verification.

Processing when an error occurs in the signature verification of the PKI103 will be described next. FIG. 7 shows the sequence when an error is produced in the signature verification.

Signature target data (signed data) including a signature generation request is transmitted from the content provider (CP) and received by the Java application 106 (S101). The Java application 106 outputs the received signature target data to the PKI103 (S103). The PKI103 removes a root certificate and subroot certificate from the UIM200 via the CDF104 and performs signature verification for the signature target data that uses the root certificate and subroot certificate (S202, S203), whereupon the Java application 106 is informed of the verification results (S204). Here, because it is judged that the signature is invalid as a result of the signature verification, the Java application 106 outputs a verification error indicating that the signature is invalid and verification has failed to the content provider (S113).

Thus, when the signature is invalid and verification has failed, the Java application 106 receives notification to that effect from the PKI103 and the Java application 106 is able to transmit notification to that effect to the content provider.

The processing when a version error occurs in the UIM200 will be described next. FIG. 8 shows a sequence when a version error of the UIM200 is produced.

Signature target data (signed data) including a signature generation request is transmitted from the content provider (CP) and received by the Java application 106 (S101). The Java application 106 outputs the received signature target data to the PKI103 (S103). The PKI103 removes the root certificate and the subroot certificate from the UIM200 via the CDF104, performs signature verification for signature target data that uses the root certificate and subroot certificate (S202, S203), and notifies the Java application 106 of the verification result (S204).

The version information of the UIM200 is then acquired by the Java application 106 by way of an inquiry (S107). Here, because the specifications of the UIM200 are old and the version information is not equal to or more than a predetermined value, the Java application 106 judges that the UIM200 is unable to perform signature generation and that signature generation has failed, and the Java application 106 transmits notification to that effect to the content provider (S 108).

Thus, when it is judged by the Java application 106 that the version information of the UIM200 is not equal to or more than a predetermined value and signature generation cannot be performed by the UIM200, because notification to that effect is transmitted to the content provider, processing to perform futile signature generation is not performed by the PKI103 and processing can be performed efficiently.

The working effect of the mobile device 100 of this embodiment will be described next. According to the mobile device 100 of this embodiment, the Java application 106, which runs on the platform 102 that controls each of the devices that are constituent elements of the mobile device 100 judges whether or not the verification of the signature for the received data is required and, when signature verification is required, the Java application 106 outputs data to the platform 102 and the platform 102 is able to verify a signature that has been added to the data. As a result, signature verification is performed by the platform 102 that does not allow the user to directly handle analysis and so forth, and the leakage of confidential information relating to signature verification can be prevented to a high level, whereby advanced security services can be implemented. Further, duplication of the verification function and storage in the mobile device 100 can be prevented, whereby efficient usage of the resources of the mobile device 100 is made possible. In addition, the verification function for signature verification can be rendered unnecessary for the Java application 106 and cost reductions for the development of the Java application 106 are possible.

Furthermore, according to the mobile device 100 of this embodiment, in cases where it is judged whether the Java application 106 is capable of signature generation and it is judged that signature generation is possible, the platform 102 performs signature generation and the Java application 106 is able to transmit data for which a signature has been generated. As a result, because signature generation is performed by the platform 102 that does not allow the user to handle analysis and so forth directly, the leakage of confidential information relating to signature generation can be prevented to a high level and advanced security services can be implemented. Further, duplication of the signature generation function and storage in the mobile device 100 can be prevented, whereby efficient usage of the resources of the mobile device 100 is made possible. In addition, a generation function for signature generation can be rendered unnecessary for the Java application 106 and cost reductions for the development of the Java application 106 are possible.

Furthermore, according to the mobile device 100 of this embodiment, the platform program. 102 transmits data to the UIM200, the UIM200 receives data, and the UIM200 is able to perform signature generation for the received data. As a result, the leakage of confidential information (root certificate, secret key, and so forth) relating to the signature generation of the UIM200 can be prevented to a high level by using the platform 102 that a general user is unable to handle directly, whereby advanced security services can be implemented.

Moreover, according to the mobile device 100 of this embodiment, when the Java application 106 verifies the version information of the UIM200 and a UIM200 of a predetermined version or lower is mounted, it can be judged that the UIM200 does not have a predetermined function (signature generation function) and data constituting the target of the signature generation is not output to the platform 102 so that the signature generation processing is not continuous and, in cases where it is judged that the version information is a predetermined version or higher, it can be judged that the UIM200 has a predetermined function (signature generation function) and data is output to the platform 102. As a result, when the version information of the UIM200 is less than the predetermined version, the Java application 106 is able to judge that there is no secret key and the UIM200 does not have the signature generation function, whereby the execution of futile processing by the platform 102 can be prevented. Further, when the version information of the UIM200 is a predetermined version or higher, the Java application 106 is able to judge that signature generation can be performed and reliable signature generation processing by the platform 102 can be executed.

In addition, the mobile device 100 comprises an internal memory (not shown) that is contained in the main body of the mobile device 100 and which stores signature generation information (a secret key and so forth) for performing signature generation for received data. The platform 102 preferably extracts signature generation information from the internal memory and performs signature generation for data by using signature generation information.

According to the invention, signature generation information can be stored in the internal memory and the platform 102 is able to perform signature generation by using the signature generation information. There is no need to provide an external memory (UIM200, for example) for signature generation and the signature generation function can be implemented at low cost. In addition, the confidentiality of essential confidential information such as signature generation information can be improved.

What is claimed is:

1. A communication device comprising:
one or more processors, the one or more processors being programmed to provide a platform program configured to control functional units that are included in the device, and being programmed to provide an application that runs on the platform program, the platform program having a data reception function that can receive content data for which a signature can be generated; and
a user identity module which generates a signature for the received content data,
wherein the application is configured to judge whether it is possible for the communication device to generate a signature for the received data by making a request to the user identity module to request whether a generation of the signature is possible based on version information of the user identity module, and the user identity module generates a signature for the content data if it is possible to generate the signature, and delivers the signature to the platform program;
the application is configured to output the received content data to the platform program when it is judged that signature generation can be performed by the communication device;

the platform program integrates the signature into the content data to generate signed content data; and the application transmits the signed content data, and wherein the user identity module is detachable from the communication device, and wherein the application is further configured to verify the version information indicating a version of a signature generating function of the user identity module, and does not output data to the platform program when the user identity module is judged not to have the signature generating function on a basis of the version information, and outputs data to the platform program when the user identity module is judged to have the signature generating function on a basis of the version information.

2. A digital signature generation method of a communication device, the communication device including one or more processors being programmed to provide a platform program configured to control functional units that are included in the device, and being programmed to provide an application that runs on the platform program, the platform program having a data reception function that can receive content data for which a signature can be generated, the communication device further including a user identity module that is detachable from the communication device, which generates a signature for the received content data, the method comprising:

a judging step performed on the one or more processors of the communication device in which the application judges whether it is possible for the communication device to generate a signature for the received content data, the application making a request to the user identity module to request whether a generation of the signature is possible based on version information indicating a version of a signature generating function of the user identity module;

an outputting step in which the application outputs the received content data to the platform program when it is judged in the judging step that signature generation can be performed by the signature generating function of the user identity module of the communication device;

a signature generating step in which the user identity module generates a signature for the content data if it is possible to generate the signature and delivers the signature to the platform program;

a signing step in which the platform program integrates the signature into the content data and outputs the signed content data to the application; and a transmitting step in which the application transmits the content data signed in the signing step.

3. A communication device comprising:

a hardware processor programmed to provide a platform program configured to control functional units that are included in the communication device, and to provide an application that runs on the platform program, the platform program having a data reception function that can receive content data for which a signature can be generated; and a user identity module which generates a signature for the received content data, the user identity module is detachable from the communication device, wherein the application is configured to judge whether it is possible for the communication device to generate a signature for the received data by making a request to the user identity module to request whether a generation of the signature is possible based on version information of the user identity module, and the user identity module generates a signature for the content data if it is possible to generate the signature, and delivers the signature to the platform program;

the application further configured to verify the version information indicating a version of a signature generating function of the user identity module, and does not output received content data to the platform program when the user identity module is judged not to have the signature generating function on a basis of the version information, and outputs received content data to the platform program when the user identity module is judged to have the signature generating function on a basis of the version information.

* * * * *